United States Patent [19]

Gorski

[11] 3,801,826

[45] Apr. 2, 1974

[54] INPUT FOR SHIFT REGISTERS

[75] Inventor: Stanley R. Gorski, Chicago, Ill.

[73] Assignee: Teletype Corporation, Skokie, Ill.

[22] Filed: May 12, 1972

[21] Appl. No.: 252,696

[52] U.S. Cl. ............................ 307/221 C, 307/304

[51] Int. Cl. ............................................ H03k 23/22

[58] Field of Search ............ 307/221 C, 221 D, 208; 317/235 G

[56] References Cited

UNITED STATES PATENTS

| | | | |
|---|---|---|---|
| 3,660,697 | 5/1972 | Berglund et al. | 317/235 |
| 3,524,077 | 8/1970 | Kaufman | 307/221 C |
| 3,582,686 | 6/1971 | Perkins | 307/221 C |
| 3,576,447 | 4/1971 | McKenny | 307/221 C |
| 3,619,642 | 11/1971 | Dunn | 307/221 D |
| 3,621,283 | 11/1971 | Teer | 307/221 D |

*Primary Examiner*—Jerry D. Craig

*Attorney, Agent, or Firm*—William G. Dosse; John L. Landis

[57] ABSTRACT

A bucket-brigade (charge-transfer-type) shift register wherein an input capacitance is provided substantially equal to the interstage capacitance of the shift-register. The input capacitance is selectively grounded in response to input data signals of one type, after each charge transfer. Subsequently, the input capacitance is recharged to the optimum level for data charge transfer in order to maximize the number of stages possible before a refresh amplifier is needed.

16 Claims, 3 Drawing Figures

INPUT FOR SHIFT REGISTERS

FIELD OF THE INVENTION

This invention relates to charge-transfer-type memory circuits and more particularly to an input circuit therefor, which maximizes the number of stages possible between refresh operations.

BACKGROUND OF THE INVENTION

Bucket-brigade or charge-transfer-type shift register memory circuits are known in the prior art. (Integrated MOS and Bipolar Analog Delay Lines using Bucket-Brigade Capacitor Storage, by F. L. J. Sangster, p. 74, Proce 1970 IEEE Int'l. Solid-States Circuits Conference). These shift registers transfer data from an input terminal to an output terminal in the form of a charge on a capacitor. The maximum number of stages possible between an input and an output of a bucket-brigade shift register is limited by two factors. One factor is the leakage of charge from the interstage capacitance, which tends to attenuate the voltage level of the signal. This phenomenon is also related to cycling speed of the memory since the lower the cycle speed, the longer each bit of data remains on a given capacitor and can leak off.

The second factor is charge optimization. If charge is transferred from a large capacitor to a smaller capacitor, this charge will be transferred to the point that the voltages on the two capacitors are equal. At the end of charge transfer, the actual charge on the smaller capacitor is less than the charge on the larger capacitor prior to transfer.

If the charge is now transferred from the smaller capacitor to a significantly larger capacitor for a given charge transfer, the voltage on the larger capacitor rises less than the voltage falls on the smaller capacitor when they seek an equilibrium at the same voltage. Therefore, mismatching of capacitors in the bucket brigade circuit causes degradation and attenuation of the charge signal.

In the manufacture of a bucket-brigade shift register, every effort is made to keep interstage capacitors as equal as possible. These shift registers shown in the prior art contain input circuits which are not matched with the initial stages of the shift register, thereby limiting the number of stages possible before the signal must be refreshed.

Therefore, an object to the present invention is to provide an input circuit to a charge-transfer shift register which will maximize the number of stages possible at any given clock rate before refresh amplification is necessary.

Another object to the present invention is to match the input capacitance of a charge-transfer-type register with the interstage capacitance of the register.

Still another object of the present invention is to optimize the input voltage of the transfer charge in a charge-transfer-type shift register in order to maximize the number of stages possible before refresh is necessary.

Yet another object of the present invention is to optimize the output voltage from a refresh amplifier used in a charge-transfer-type shift register.

SUMMARY OF THE INVENTION

In accordance with the present invention, an input stage to a charge-transfer-type shift register is constructed so as to duplicate as nearly as possible the interstage capacitance of each shift register stage or a cell. In accordance with another aspect of the present invention, the input capacitance of a charge-transfer memory circuit is selectively discharged in response to receipt of data signals and is subsequently partially recharged to an optimum voltage for charge transfer.

BRIEF DESCRIPTION OF THE DRAWINGS

The present invention will be more readily understood by reference to the following detailed description, when considered in conjunction with the accompanying drawings, in which like reference numbers refer to the same or similar parts throughout the several figures and wherein.

DETAILED DESCRIPTION OF THE INVENTION

A - GENERAL ARRANGEMENT

Figures 1, 3:
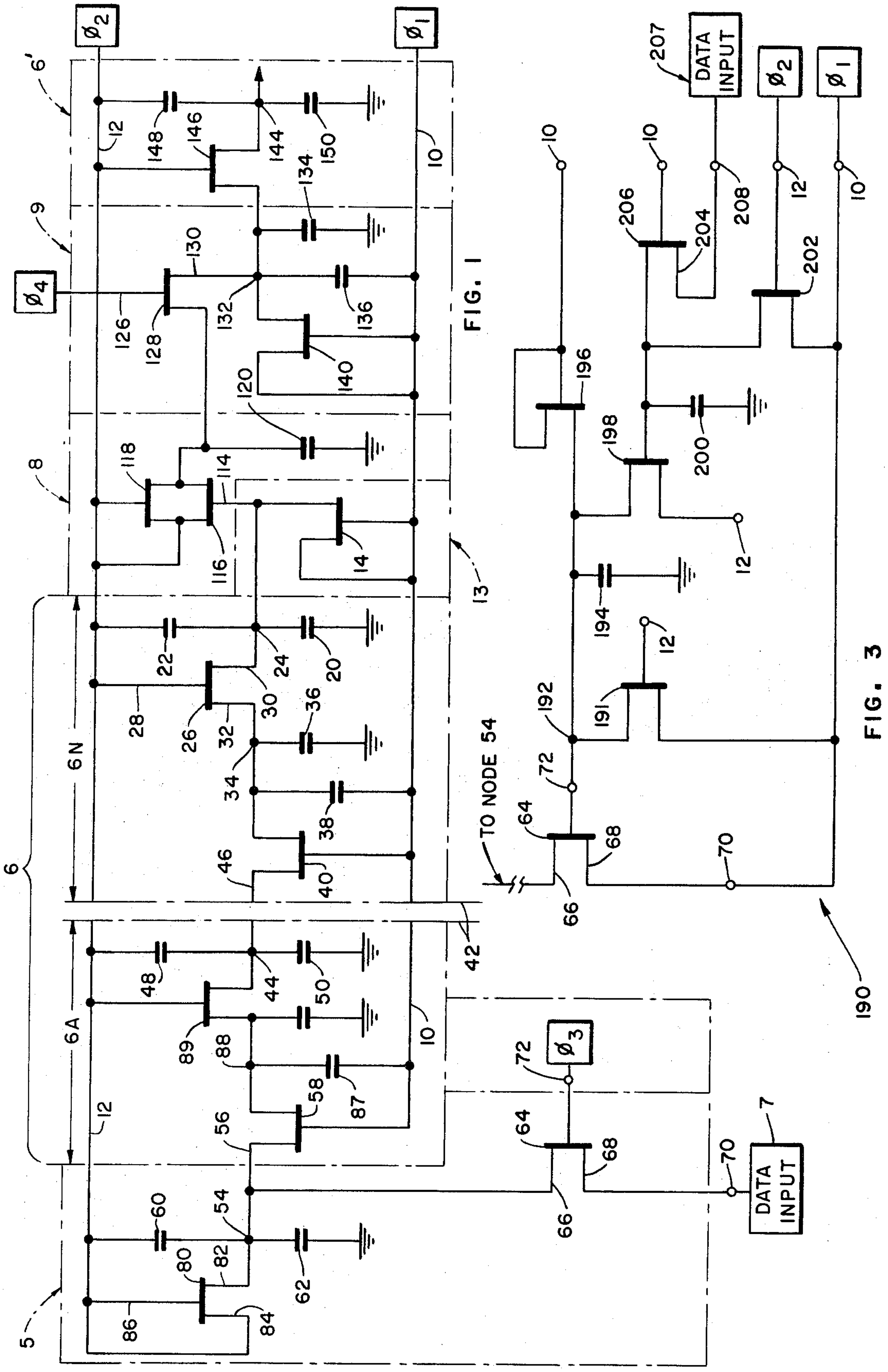
FIG. 1 is a schematic diagram of a metal oxide semiconductor field-effect transistor circuit having input circuits in accordance with one embodiment of the present invention.
FIG. 3 shows an alternate circuit for feeding in data.
Figure 2:
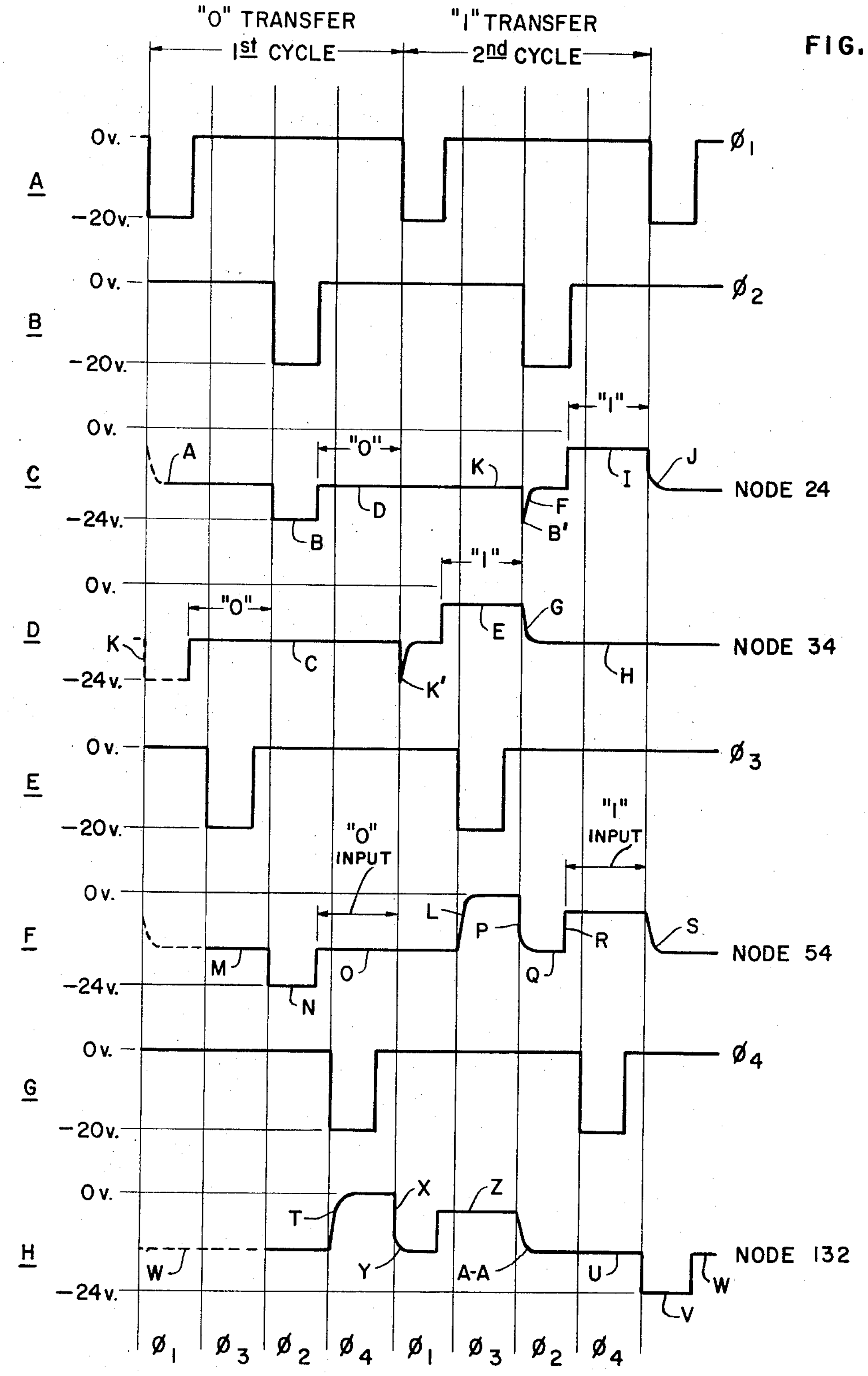
FIG. 2(A-H) are timing diagrams illustrating various voltage-time relationships involved in the circuit of FIG. 1.

Referring to FIGS. 1 and 2, an input circuit 5 in accordance with the first embodiment of this invention provides a train of specially regulated data-input signals to a first stage 6A of a generally prior-known MOS bucket-brigade shift register 6. Each input signal is in sequence, as is customary, is a selected one of two binary input voltages representing the state "1" or "0" of a bit of data, and is derived from a "Data Input" source 7. In a manner to be described, the data input signal is shifted, one position or stage to the right during each complete cycle of two main clocking pulses $\phi_1$ and $\phi_2$ (FIGS. 2A and 2B), and ultimately arrives at a last or *n*th stage 6N of the shift register 6, typically for example thirty stages or cycles later. One stage or position comprises a pair of MOS field-effect transistors connected to opposite clock bus conductors 10 and 12.

From the final stage 6N of the register 6, the data signals are inverted by an inverter circuit 8 and then applied as an input to an input circuit 9. The inverter circuit 8 and the input circuit 9, together comprise a refresh amplifier which restores the data signals to their original strength. The refresh amplifier then provides an input signal in accordance with this invention, similar to the input provided by the circuit 5, to a first stage of a following shift register 6' similar to the register 6.

The shift register stages and other circuits are operated in succession, as will be described, by two main clocking inputs $\phi_1$ and $\phi_2$, carried on clock bus conductors 10 and 12; the data input circuit 5 of FIG. 1 is additionally triggered by a third clock pulse $\phi_3$ (FIG. 2E) between $\phi_1$ and $\phi_2$, and the refresh amplifier is triggered by a fourth clock pulse $\phi_4$ (FIG. 2G) occurring between $\phi_2$ and $\phi_1$.

In general, the shift register 6 sequentially transfers the data from circuit 5 one stage to the right during each cycle, by either transferring or not transferring a portion of a capacitor charge to the left from one stage to the next preceding stage, depending on the value of the data bit at the preceding stage. In the example described, a "1" bit causes leftward charge transfer along the register 6, while a "0" bit precludes any effective charge transfer.

Whenever necessitated by charge transfer, a fresh reference charge is impressed on the final stage 6N by a charge-input circuit 13, at the start of each cycle ($\phi_1$). This charge is then transmitted or not transmitted to the left during following cycles, depending on the values of the incoming bits, and eventually reaches the input circuit 5. Finally, the transferred charge is selectively discharged to ground at the data input source 7, whenever the next input bit is of one designated binary state (a binary "1" in the example described).

With this general background in mind, the specific operation of the shift register 6 will next be described, followed by a description of the input circuit 5, the charge refresh amplifier 9, and finally the alternate input circuit shown in FIG. 3.

B - BUCKET-BRIGADE SHIFT REGISTER 6

The ensuing description will follow the selective transfer of charge from the charge-input circuit 13 and the final stage 6N of the register 6 to the left in FIG. 1, toward the data-input circuit 5. At the start of each cycle (clock pulse $\phi_1$), the clock conductor 10, which is normally at ground potential, experiences a cyclical excursion from ground potential to some negative voltage, −20 volts in the specific example, in a well-known fashion. On each negative excursion of the $\phi_1$ clock pulse, an input field-effect transistor 14, which has its gate electrode and one of its controlled electrodes connected to the clock conductor 10, may become conductive and charge a pair of interstage capacitors 20 and 22 which are connected together at a terminal referred as a node 24.

As will be described, the transistor 14 turns ON during $\phi_1$ to charge the capacitors 20 and 22 whenever a "1" data signal was previously present at the node 24. As illustrated, the capacitor 20 has one electrode connected to the node 24 and the other electrode connected to ground, while the capacitor 22 is connected between the node 24 and the $\phi_2$ clock conductor 12. The capacitor pair 20–22 is typical of interstage capacitor pairs provided throughout the shift-register circuit.

The present circuit is intended as an integrated circuit to be formed on a single metal-oxide semiconductor (MOS) substrate, wafer, or chip. Therefore, the capacitors can be either intrinsic to the formation of other portions of the circuit or can be separately formed in the chip during its manufacture. For example, the capacitor 20 can be an enlarged diffusion on the MOS substrate, and the capacitor 22 can be an enlarged gate overlap region of an MOS field-effect transistor.

When the transistor 14 turns ON during $\phi_1$, the capacitors 20 and 22 are charged to the negative voltage of the clock conductor 10, minus a substantial threshold voltage of the transistor 14. The magnitude of this threshold voltage is dependent upon many factors including the manner in which the chip was manufactured and the voltage difference between the source electrode of the field-effect transistor 14 and the substrate - usually the most positive voltage used with the circuit. This threshold voltage must exist between the source and gate electrodes of the field-effect transistor for it to be in the ON condition. For ease of understanding, the threshold voltage is taken here as being a constant of about six volts in this example. Therefore, the field-effect transistor 14, whenever actuated during $\phi_1$, charges the node 24 to approximately −14 volts during each $\phi_1$ clock pulse, in a typical example as indicated by the line A in FIG. 2C.

After the $\phi_1$ clock pulse, the clock bus conductor 10 returns to ground voltage, the input transistor 14 turns OFF and the node 24 is thereafter isolated from the $\phi_1$ conductor 10 until the next $\phi_1$ pulse. Thus, the input circuit 13 selectively impresses a reference charge of −14 volts on the node 24 during the $\phi_1$ pulse whenever a "1" was previously present at that node. As will be discussed, if a "0" was previously present at the node 24, a previously applied reference charge of −14 volts remains at the node 24. In any event, at the end of each $\phi_1$ pulse, the node 24 is invariably charged to the reference voltage of −14 volts. The node 24 may be considered as the output end of the final shift register stage 6N, and is also the starting point for the selective transfer of charge to the left, depending on value of an incoming data bit.

When the $\phi_2$ negative clock pulse occurs on the bus 12 some time later (FIG. 2B), the node 24 is made still more negative by the coupling of the capacitor 22 (line B in FIG. 2C). It can be seen that, if the capacitors 20 and 22 are of approximately equal capacitance, the coupling of the capacitor 22 causes the node 24 to become more negative by an amount equal to approximately 50 percent (−10 volts) of the $\phi_2$ clock pulse voltage (also −20 volts in the example). Therefore, at the beginning of the $\phi_2$ clock pulse, the node 24 is invariably charged to approximately −24 volts. This temporary extra charge from −14 to −24 volts by the capacitive coupling with $\phi_2$ represents the driving force for selective charge transfer during $\phi_2$, if the adjacent, preceding signal is a "1", as will be explained hereafter.

The negative $\phi_2$ clock pulse also may or may not turn ON a field-effect transistor 26, depending on the state of an adjacent, preceding data signal. The transistor 26 has a gate 28 connected to the $\phi_2$ clock bus conductor 12, and also a drain 30 and a source 32 connected to the node 24 and an adjacent, preceding node 34, respectively. The node 34 is connected to two interstage capacitors 36 and 38, similar to 20 and 22. As will be explained subsequently, the node 34 at the time of the $\phi_2$ pulse is at either one of two possible states: (a) a "high negative voltage" (the negative clock voltage minus the threshold voltage, or −14 volts in the example), representing a binary "0"; or (b) a "low negative voltage" approximately −4 volts in the preferred example), representing a binary "1" at the adjacent, preceding node 34.

Assuming first that the node 34 is at the high negative voltage representing a binary "0" (−14 volts) - line C in FIG. 2D - the voltage difference of 6 volts between the source 32 (−14 volts) and the gate 28 (−20 volts) of the field-effect transistor 26 will not be sufficient (more than 6 volts needed) to render the field-effect transistor 26 conductive. Therefore, no current flows through the field-effect transistor 26, and the voltages at the nodes 34 and 24 do not change during the $\phi_2$ pulse, but remain at −14 and −24 volts, respectively. After the $\phi_2$ pulse, the coupling charge applied by the capacitor 22 to the node 24 is removed and the node 24 returns to its previous state of −14 volts (line D in FIG. 2C). In this manner, a binary "0" has now been "transferred" from node 34 to node 24, meaning simply that the node 24 did not discharge a significant portion of its charge to the preceding node 34 during $\phi_2$, and that it remains at −14 volts after $\phi_2$. This state is now the "high negative charge" at the node 24, indicating a "0" output from the shift register 6, the further handling of which is discussed in Section D of this specification.

Conversely, if the node 34 is at the "low" negative voltage at the start of $\phi_2$ (−4 volts, representing a binary "1" as depicted by line E in FIG. 2D during a "second cycle" illustrated), the negative $\phi_2$ clock voltage (−20 volts) applied to the gate 28 of the field-effect transistor 26 is sufficiently more negative than the voltage (−4 volts) applied to the source 32 to render the field-effect transistor 26 conductive, the threshold voltage difference being approximately 6 volts. At the beginning of $\phi_2$, the charge at the node 24 is again boosted to −24 volts through the coupling of capacitor 22 to the $\phi_2$ bus 12, as indicated by the negative peak B′ in FIG. 2C. Current then flows from the more positive node 34 (−4 volts), through the source 32 of the field-effect transistor 26, to the drain 30 of the field-effect transistor 26, and to the node 24 (−24 volts). Simultaneously, this same current charges the capacitors 36 and 38 more negatively.

Stated in terms of charge transfer, the capacitors 22 and 20 partially discharge through the ON transistor 26, as indicated by line F in FIG. 2C, from the peak voltage B′, to increase the negative charge on the capacitors 36 and 38, as indicated by line G in FIG. 2D. This charge transfer or "dumping" from node 24 (initially at −24 volts) to node 34 (initially at −4 volts) is designed to continue until the voltages at the nodes 24 and 34 reach equilibrium at the same voltage (−14 volts in the example). In addition, the charge transfer would stop earlier if the node 34 reached the negative clock voltage minus the threshold voltage prior to equalization since, if the node 34 reached approximately the negative clock voltage minus the threshold voltage before equilibrium occurred, the field-effect transistor 26 would turn OFF and the charge dumping would stop. However, the circuit components and values are designed and chosen such that equilibrium occurs at −14 volts, which is substantially the point when the field-effect transistor 26 turns OFF. Therefore, the node 34 will always be at −14 volts after the transfer of a binary "1" to the node 24, as indicated by line H in FIG. 2D.

As previously described, the final voltage at node 34 after $\phi_2$, when a "0" is transferred (no charge transfer), is also −14 volts, as indicated by line C in FIG. 2D. Thus, the voltage at node 34 after $\phi_2$ (lines C or H) is invariably −14 volts, regardless of whether a "0" or a "1" was transferred to the node 24 during $\phi_2$. This is the same "reference voltage" to which node 24 was invariably charged prior to $\phi_2$, and (when later boosted to −24 volts) constitutes the driving force for further selective charge transfer to the left during the next occurrence of the $\phi_1$ clock pulse.

At the end of the $\phi_2$ clock pulse, the bus conductor 12 returns to ground or zero voltage. The coupling of the capacitor 22 then causes the node 24 to assume a voltage (−4 volts) that is ten volts less in magnitude than the equilibrium voltage (−14 volts), as depicted by line I in FIG. 2C. This is also the "low" negative voltage, previously described as indicating a "1". Therefore, the transfer of charge to the left through the field-effect transistor 26 during the $\phi_2$ clock pulse effectively transfers the binary "1" condition (−4 volts) one cell to the right, from the node 34 to the node 24 at the end of the $\phi_2$ clock pulse.

As will be described in Part D hereof, this binary "1" output from the shift register 6 is later (after $\phi_2$) inverted by the circuit 8 and serves as the input to the refresh amplifier 9. However, if a "1" output of −4 volts is present at the node 24 after $\phi_2$, the input transistor 14 will turn ON during the next $\phi_1$ clock pulse, as previously described, to recharge the node 24 to the reference voltage of −14 volts in preparation for the next data-transfer cycle to node 24 (the next incidence of $\phi_2$). This is indicated by the line J at the right of FIG. 2C, which corresponds to the line A (previously described) at the left of FIG. 2C. Conversely, if a "0" was transferred, the node 24 remains at −14 volts after $\phi_2$ (no charge transfer, as indicated by line K in FIG. 2C), the node 14 remains at the "reference voltage". Also, as previously mentioned, the input transistor 14 does not turn ON - in this case of a "0" transfer - during the following $\phi_1$ pulse, since insufficient gate-to-source voltage difference is available whenever a "0" is transferred.

The transistor 26 constitutes one cell or half of the shift register stage 6N, being triggered during $\phi_2$ to transfer the data signal at the node 34 to the following node 24. The stage 6N also includes a field-effect transistor 40, which operates similarly to the transistor 26, but during $\phi_1$, to transfer an incoming data signal from a preceding node to the node 34. Since many stages exist between the input and the output of the shift register 6, the dashed lines 42 are used to represent these intervening stages between the first stage 6A and the final stage 6N. A node 44 at the output end of the first stage 6A may, for purposes of illustration, be assumed to be connected directly to the source 46 of the field-effect transistor 40 across the dashed lines 42.

During the succeeding $\phi_1$ clock pulse, the negative clock pulse (−20 volts) appearing on the bus conductor 10 attempts to render the field-effect transistor 40 conductive. As shown above in connection with the binary "1" and "0" illustrations, the node 34 is always at the reference voltage of −14 volts (lines C or H in FIG. 2D) at the end of the $\phi_2$ clock pulse and remains at that voltage until the beginning of the next $\phi_1$ clock pulse. However, the node 44 can be at either the high negative voltage (−14 volts, binary "0") or at the low or negligible negative voltage (−4 volts, binary "1") in accordance with the charge on the two interstage capacitors 48 and 50 connected to the node 44.

The selective transfer of charge during the $\phi_1$ clock pulse between the nodes 34 and 44 through the field-effect transistor 40 is identical to the transfer of charge during the $\phi_2$ clock pulse by the field-effect transistor 26 between the nodes 34 and 24. Thus, at the beginning of the $\phi_1$ clock pulse, the charge at node 34 is invariably boosted to −24 volts by the coupling capacitor 38 (linkes K or K′ in FIG. 2D) and may or may not discharge partially to the node 44, depending on the incoming data signal. Therefore, at the end of the $\phi_1$ clock pulse, the node 44 is invariably charged to substantially the reference voltage of −14 volts, and the node 34 carries a charge representative of the binary information previously contained at the node 44, either −4 volts (line E) or −14 volts (line C).

In this manner, it can be seen that the selective transfer of charge from the right to the left in the bucket-brigade shift register represents the transfer of information from left to right in the bucket brigade. Consequently, the information contained on each node corresponding to the node 44 is transferred during the $\phi_1$ clock pulse to the succeeding node corresponding to the node 34. Similarly, during the $\phi_2$ clock pulse, the information contained on each node corresponding to the node 34 is transferred to a following node corresponding to the node 24.

The initial stage 6A functions in the identical way to transfer input data applied by the input circuit 5, in a specially regulated manner described in the next selection, to a node 54 comprising the input to the shift register 6. The input node 54 is connected to the source 56 of a first stage transistor 58, which may operate during the $\phi_1$ clock pulse in the same way as the transistor 40 to transfer the input data one position to the right toward the final stage 6N.

C - INPUT CIRCUIT 5

In order to provide data to the input of the bucket-brigade shift register 6, two capacitors 60 and 62 are connected to the input node 54 in exactly the same manner as the interstage capacitors 22 and 20 are connected to the node 24. Also, the capacitor 60 has a capacitance that is equal to or preferably very slightly less than the capacitance of the capacitor 48; and the capacitance of the capacitor 62 is equal to or preferably very slightly less than the value of the capacitor 50.

In the transfer of charge from right to left the shift register, there is a small charge leakage which causes the charge voltages to drop slightly. To compensate for this leakage, it is desirable to increase slightly (about 5 percent) the capacitance at the last node 24 and to decrease slightly (about 5 percent) the capacitance at the input node 54. This increase in the capacitance at the node 24 will not alter the "0" state voltage on the node 34 after each $\phi_1$ clock pulse but the node 34 will be at the same voltage as the clock voltage less the threshold voltage (i.e., −14 volts) because the field-effect transistor 26 cuts off at that voltage. However, if the capacitance of the node 24 is slightly larger, the node 34 will be assured of receiving its full charge. By the time this charge reaches the node 44, leakage has reduced its voltage magnitude to somewhat less than −14 volts. Consequently, the charge, when transferred to the slightly-lower-capacitance node 54 will be more nearly equal to −14 volts.

These slight differences in the capacitances of the nodes 24 and 54 are built into the shift register in manufacture. The entire shift register is made as an integrated circuit on a single metal-oxide-semiconductor (MOS) chip. The grounded capacitors 20 and 36 are the intrinsic capacitances resulting from the drain and source diffusions of the field-effect transistors (FET's) 26 and 40, respectively. In order to increase or decrease these capacitances, the diffusion areas of the drains of the associated FET's are increased or decreased.

Similarly, the capacitors 22 and 38 are the intrinsic gate-to-drain capacitances formed by the overlap of the gate electrode and the drain diffusion, with the thin-oxide gate dielectric therebetween. The values of capacitance of the capacitors 22 and 38 are thus controlled by controlling the area of overlap between the drain diffusions and gate electrodes of the FET's 26 and 40.

In a bucket-brigade shift register such as that described herein, many intrinsic capacitances exist in addition to those shown in the accompanying drawing. These stray capacitances are undesired and unavoidable, but are minimized in manufacture.

Except for the abovementioned preferred 5 percent lower value of capacitance at the node 54, it is desired to make the input stage 5 as much as possible like the other stages of the shift register. Such duplication causes the input stage 5 to contain as nearly as possible all of the other, stray intrinsic capacitances found in a shift register stage. These similarities further enhance the matching of the input characteristics to the characteristics of each shift register stage so as to optimize charge transfer.

The drain 66 of an input field-effect transistor 64 is also connected to the node 54. The source 68 of the field-effect transistor 64 is connected to an input terminal 70, and the gate of the field-effect transistor 64 is connected to another input terminal 72. After the end of the $\phi_1$ clock pulse and before the beginning of the next $\phi_2$ clock pulse, the node 54 can be selectively discharged to ground potential through the field-effect transistor 64, in order to provide a "1" data input to the shift register in the example given.

In the first, and simplest embodiment of the input circuit shown in FIG. 1, the source 68 of the field-effect transistor 64 is connected via the input terminal 70 of the data input source 7. The data source 7 supplies a voltage that is substantially zero or ground voltage in order to represent a binary "1". To represent a binary "0", the data source 7 supplies a voltage which should be at least as negative as the negative clock pulse voltage less a threshold voltage (i.e., −14 volts). In a practical application of the shift register circuit, the data input source 7 might comprise the output of another shift register. The output of the shift register will subsequently be shown to be either −14 volts (clock voltage less a threshold voltage) or ground voltage (rather than −4 volts, as would otherwise be expected).

The gate terminal 72, in this embodiment, is connected to the third clock pulse signal which provides a negative pulse of −20 volts in the example, only after the end of the $\phi_1$ clock pulse and prior to the beginning of the $\phi_2$ clock pulse as illustrated in FIG. 2E. Therefore, if a binary "1" is to be inserted at the input node 54, substantially ground voltage is applied to the terminal 70 and the negative clock pulse $\phi_3$ is applied to the terminal 72, causing a substantial negative gate-to-source voltage to be applied to the field-effect transistor 64. This causes the field-effect transistor 64 to become conductive and to discharge the capacitors 60 and 62 of the node 54 to the ground voltage of the terminal 70, as depicted by the line L in the right-hand or "second cycle" portion of FIG. 2F. Prior to $\phi_3$, the node 54 is invariably at the "0" state or reference voltage of −14 volts for reasons similar to the operation of the nodes 34 and 44 as will be explained hereafter.

Alternatively, if the input terminal 70 is held at a high negative voltage, at least as negative as the clock voltage less a threshold (binary "0"), the field-effect transistor 64 is held OFF by a negligible or insufficient voltage difference between its source and gate, as previously discussed with respect to the transistors 14 and 26. Therefore, the node 54 is not discharged, but remains at substantially −14 volts after $\phi_3$ as indicated by line M in the left-hand portion of FIG. 2F.

Assuming that the node 54 has been discharged to ground potential, in order to insert a binary "1" at the node 54 (line L) of FIG. 2F, the ground voltage on the node 54 is not the most desirable voltage for charge transfer.

It has been shown that a charge of approximately −14 volts is inserted by the FET 14 into the node 24 and is transferred to the left in the shift register. A "1" state signal is represented by a charge at only −4 volts and is transferred to the right by displacing a charge at −14 volts to the left. If a ground or zero-volt signal were present at a given node, the following node would still be at −14 before transfer. After charge transfer, the given node would be at only −12 and the following node would be at −2 volts. After several successive transfers, such voltage variations can become large enough to cause uncertainty as to the binary state represented. Therefore, −4 volts is the optimum voltage for transferring a "1" state signal in the present example, rather than ground or zero voltage.

In another example of optimum charge transfer voltage assume that the capacitors 60 and 62, 38 and 36, and 22 and 20 are approximately all equal. If the clock voltage is now assumed to be −16 volts and a six-volt threshold is assumed, the FET 14 charges the node 24 to approximately −10 volts. The coupling of the capacitor 22 raises the node 24 to −18 volts at the start of the $\phi_2$ clock pulse. If the node 34 is at ground or zero voltage, current will flow through the FET 26 until the nodes 24 and 34 reach an equilibrium at −9 volts. After the end of the $\phi_2$ clock pulse, the coupling of the capacitor 22 changes the node 24 to −1 volt rather than the original ground voltage. Similarly the node 34 is only at −9 volts rather than the −10 volts to which the node 24 had existed prior to the $\phi_2$ pulse.

However, if the node 34 had been at −2 volts prior to the $\phi_2$ clock pulse, the nodes 34 and 24 would have reached an equilibrium at −10 volts. The coupling of the capacitor 22 would then leave the node 24 at −2 volts after the $\phi_2$ clock pulse, and the node 34 would be left at −10 volts. Consequently, with the −16 volt clock pulse, as set forth above, −2 volts is the optimum binary "1" voltage for the charge transfer.

It can be induced from these examples that the binary "0" should be represented by the clock voltage less a threshold. The binary "1" should then be represented by a voltage equal to the binary "0" voltage less a proportion of the clock voltage. That proportion is the ratio of the clock-coupling capacitance (22, 38, or 60) to the total node capacitance. In the examples explained herein, this proportion is assumed to be approximately one-half.

In order to optimally adjust the data input charge in accordance with the invention, a field-effect transistor 80 has its source electrode 82 connected to the node 54. The drain 84 and gate 86 of the field-effect transistor 80 are both connected to the $\phi_2$ clock bus conductor 12. Therefore, after the termination of the $\phi_3$ clock pulse, the $\phi_2$ clock pulse begins and attempts to turn on the field-effect transistor 80.

If the node 54 was required during $\phi_3$ to retain its charge of −14 volts (line M of FIG. 2F), indicating that a binary "0" is to be inserted, the field-effect transistor 80 will remain OFF for lack of a sufficient threshold voltage difference as previously described. The voltage at node 54 will temporarily increase to −24 volts during $\phi_2$ due to the coupling of the capacitor 60 (line N), but will then return to −14 volts after $\phi_2$ (line O) and comprises the binary "0" input previously described.

Conversely, if the node 54 has been discharged to substantially ground voltage during $\phi_3$ (line L of FIG. 2F), an adequate source-to-gate voltage difference exists on the field-effect transistor 80 to cause it to become conductive, even after the coupling of the capacitor 60 boosts the node 54 from ground to approximately −10 volts (line P, FIG. 2F). The field-effect transistor 80 then charges the node 54 from −10 volts to −14 volts (substantially the voltage of the negative clock less the threshold voltage), as indicated by line Q in FIG. 2F. After the termination of the $\phi_2$ clock pulse, the clock bus 12 returns to ground voltage. The coupling of the capacitor 60 causes the node 54 then to assume a voltage that is ten volts (one-half of the clock voltage of −20 volts) less than the negative clock voltage minus the threshold voltage, as indicated by the line R in FIG. 2F. This is the ideal, optimum voltage (−4 volts) for charge transfer through the bucket brigade and constitutes the binary "1" input previously described.

Such optimum charge characteristics are obtained by having the capacitance of the node 54 substantially equal to or very slightly less than the capacitance of the other nodes of the bucket-brigade shift register as mentioned previously. By this technique, the optimum charge transfer voltage is achieved by discharging the node 54 excessively through the input field-effect transistor 64, and then adjusting the charge of the node 54 back up to the optimum voltage for charge transfer.

In the operation of the input circuit, to insert a binary "1" data bit into the shift register 6, the node 54 is first grounded by the field-effect transistor 64 during $\phi_3$ (line L of FIG. 2F). The next $\phi_2$ clock pulse is coupled through the capacitor 60 to make the voltage of the node 54 ten volts more negative (line P). The field-effect transistor 80 then turns ON and conducts current so as to correct the voltage of the node 54 to −14 volts (line Q). At the end of the $\phi_2$ clock pulse, the coupling of the capacitor 60 makes the node 54 ten volts more positive (to −4 volts), line R, and the binary "1" input is now optimally available to the source 56 of the first transistor 58 of the shift register.

The subsequent $\phi_1$ clock pulse turns ON the field-effect transistor 58 and couples through an interstage capacitor 87 (similar to the capacitors 38 and 22) to make the following node 88 ten volts more negative (to −24 volts) as previously described with respect to the node 24. Current flows through the field-effect transistor 58, which charges the node 54 to −14 volts (line S of FIG. 2F) and discharges the node 88 to −14 volts, as previously described with respect to nodes 24 and 34. At the end of the $\phi_1$ clock pulse, when the bus 10 returns to ground voltage, the node 88 changes to −4 volts as previously described with respect to the node 24 (similar to line E in FIG. 2D). This completes the transfer of the binary "1" from the input node 54 to the first intermediate node 88, from which point it is transferred to the following node 44 during the next $\phi_2$ pulse in the manner previously described. This also explains how the node 54 again arrives at the −14 volt reference voltage after $\phi_1$ in the case of a "1" input (line M and line S in FIG. 2F).

After the end of the $\phi_1$ clock pulse, the field-effect transistor 64 again attempts to discharge the node 54 to ground voltage during the next $\phi_3$ pulse. Assuming that the field-effect transistor 64 this time has entered a binary "0" into the node 54, by failing to discharge the node 54 (line M at the left of FIG. 2F), the next $\phi_2$ clock pulse is coupled through the capacitor 60 to the node 54 and changes the node 54 to −24 volts (line N). Consequently, no current flows through the field-effect transistor 80 during $\phi_2$; and when the $\phi_2$ clock bus 12 returns to ground voltage, the coupling of the capacitor 60 changes the node 54 back to −14 volts, to represent a binary "0" (line 0, FIG. 2F).

During the next $\phi_1$ clock pulse, this "0" (−14 volts) at the node 54 is transferred to the following node 88 in the manner previously described, by failing to turn on the following transistor 58 and thus failing to partially discharge the node 88 to the node 54. The field-effect transistor 58 does not conduct any substantial amount of current in this case; because, there is only a difference of six volts (barely a threshold) between the source electrode 56 and the gate electrode of the field-effect transistor 58, which is connected to the $\phi_1$ clock bus 10. At the end of the $\phi_1$ clock pulse, the coupling of the capacitor 87 changes the node 88 back to −14 volts to represent a binary "0", which is thereafter transferred to the node 44 during the next $\phi_2$ pulse in the usual manner.

Thus, the progress of binary "1" and "0" signals has been shown in this Section from the field-effect transistor 64 to the node 54, thence to the nodes 88 and 44 of the shift register 6, while the preceding Section B described the transfer along the shift register to the output node 24. The following Section D covers the further processing of the data signals from the node 24 by the refresh amplifier 9.

D - CHARGE REFRESH AMPLIFIER 9

As previously indicated, the charge transferred from node to node tends to leak off and otherwise diminish as the number of shift register stages. Therefore, it is necessary periodically to "refresh" the charge, or restore it to its original strength; for example, after thirty stages of a register such as illustrated. This is accomplished by a charge-refresh circuit 9, which consists substantially of a regulated-charge input circuit in accordance with this invention, and an output circuit 8.

Output from the bucket-brigate shift register 6 is normally obtained from the node 24 after the $\phi_2$ clock pulse and before the next $\phi_1$ clock pulse. During the $\phi_2$ clock pulse, the field-effect transistor 26 selectively may partially discharge the capacitors 20 and 22 at the node 24 in accordance with the prior, data-representing charge condition of the capacitors 36 and 38 at the node 34, as previously described in Section B. To review that operation, the charge at node 24 after $\phi_2$ is either −14 volts for a binary "0" output (line D in FIG. 2C), or −4 volts for a binary "1" output (line I in FIG. 2C). After the $\phi_2$ clock pulse, the charge on the node 24 is available to control the gate electrode 114 of the field-effect transistor 116 of the inverter circuit 8.

During each $\phi_2$ clock pulse, a field-effect transistor 118 assures that an output capacitor 120 is fully charged to substantially the negative clock voltage less the threshold voltage, to −14 volts in the example given.

The presence of a negligible or substantially ground voltage (−4 volts in the example, indicating binary "1") at the node 24 after the termination of the $\phi_2$ clock pulse (line I in FIG. 2C) keeps the field-effect transistor 116 turned OFF, so that the output capacitor 120 remains charged. A continuing charged state of the capacitor 120 after $\phi_2$ thereby indicates that a binary "1" is present on the node 24, for generating one type of input to the next bucket-brigade shift register 6' at the right of FIG. 1.

On the other hand, if the node 24 is charged to approximately the negative clock voltage less the threshold voltage (approximately −14 volts, representing a binary "0" condition), as indicated by line D in FIG. 2C, the field-effect transistor 116 remains ON after the termination of the $\phi_2$ clock pulse, and as long thereafter as the substantial negative voltage is present on the node 24 (until the next "1" signal arrives at the node 24). When the field-effect transistor 116 is ON, it discharges the capacitor 120 and anything else connected to it to the now grounded $\phi_2$ clock bus 12. Note that this is similar to the grounding of the node 54 in the input circuit 5, through the transistor 64, whenever a binary "1" is to be inserted into the shift register 6.

Some time after the end of the $\phi_2$ clock pulse, but before the beginning of the next $\phi_1$ clock pulse, the $\phi_4$ clock pulse (FIG. 2G) is applied to a clock terminal 124 which is connected to the gate electrode 126 of a field-effect transistor 128. The drain 130 of the field-effect transistor 128 is connected to an input node 132 of the next bucket-brigade shift register 6'. The input node 132 corresponds approximately to the input node 54.

During the $\phi_4$ clock pulse, the capacitors 134 and 136 of the input node 132 are selectively discharged to the grounded $\phi_2$ clock conductor 12 by the selectively conductive field-effect transistor 116 whenever that transistor is ON, indicating a "0" or −14 volt output at node 24. This is indicated by line T in FIG. 2H, which depicts the charge at node 132 at various times for both "0" and "1" transfer. Prior to the $\phi_4$ clock pulse, the capacitors 134 and 136 of the node 132 are invariably charged to the reference charge of −14 volts (the negative clock voltage minus the field-effect transistor threshold voltage), in a manner described hereafter. Therefore, if the node 24 is at −14 volts (binary "0"), it maintains the field-effect transistor 116 ON and the node 132 is selectively discharged to ground (line T) through the field-effect transistors 128 and 116 during the duration of the $\phi_4$ clock pulse applied to the clock terminal 124. However, if the node 24 is at −4 volts (binary "1"), the field-effect transistor 116 is in the OFF condition, and the node 132 remains at −14 volts during $\phi_4$ (line U in FIG. 2H).

In this way, a substantial, negatively-charged condition of the node 24 results in a discharged or ground-voltage condition of the node 132. A substantially discharged, or −4 volts, condition of the node 24 results in a negatively-charged condition of the node 132. Thus, the data signal at node 24 is inverted by the transistors 116 and 118 and capacitor 120 of the inverter circuit 8, and the inverted signal is available at the node 132 after $\phi_4$. After the termination of the $\phi_4$ clock pulse, the field-effect transistor 128 is turned OFF, thereby decoupling the node 132 from the field-effect transistor 116.

After the termination of the $\phi_4$ clock pulse, the next $\phi_1$ clock pulse attempts to turn ON a field-effect transistor 140 (analogous to the field-effect transistor 80). Simultaneously, an additional charge of −10 volts (approximately half of the $\phi_1$ clock voltage) is applied to the node 132 through the coupling of the capacitor 136, similar to the action of the coupling capacitor 60 described in Section C. If the node 132 has previously remained charged to −14 volts as a result of a discharged ground-voltage condition of the node 24 (line U of FIG. 2H), the transistor 140 remains OFF through lack of sufficient gate-to-source voltage difference.

In this situation, the node 132 is additionally charged to −24 volts during $\phi_1$ (line V of FIG. 2H) due to the coupling of the capacitor 136, and then reverts to its previous charge of −14 volts after $\phi_1$ (line W). In this manner, it is seen that the node 132 retains the voltage of −14 volts after $\phi_1$ whenever a "1" was transferred from the last stage 6N of the previous shift register 6.

Conversely, if the node 132 has been discharged to substantially ground by a sutstantial negative voltage at the node 24 prior to the $\phi_1$ clock pulse, the coupling capacitor 136 first increases the charge to −10 volts (line X of FIG. 2H), and the field-effect transistor 140 turns ON to further charge the node 132 to the clock pulse voltage minus the threshold voltage, or approximately −14 volts (line Y). After the termination of the $\phi_1$ clock pulse, the coupling of the capacitor 136 to the $\phi_1$ clock bus 10 reduces the magnitude of the negative voltage of the node 132 to the negligible, negative voltage (−4 volts) optimum for the charge transfer through the remainder of the bucket-brigade, as indicated by line Z.

In this manner, the transistor 140 and capacitor 136 function to selectively charge the input node 132 of the second shift register 6′ to the optimum "low negative voltage" of approximately −4 volts whenever a binary "0" was transferred from the preceding shift register 6. It should be noted that this optimum charge adjustment by the transistor 140 and capacitor 136 is precisely the same as that provided by the input transistor 80 and coupling capacitor 60. Thus, the input data signals, initially provided by the input circuit 5, have been regenerated and precisely reconstituted by the refresh amplifier 9, only in inverted sense such that the optimum low negative voltage of −4 volts at node 132 (line Z) now indicates a binary "0" and the "high" negative voltage of −14 volts (line W) indicates binary "1". This inversion (caused by the operation of the transistor 116) is of minimal practical significance in the operation of a shift register system. If an even number of shift registers, each having one inverter output stage, are employed together in a long series of shift registers, each data bit is then inverted an even number of times and is delivered at the final output stage in its original binary sense. If an odd number of shift registers are used, each with one inverter, then the inverse of the desired output must be delivered to the input of the long series of shift registers.

Once the data bit (or its inverse) is present as the state of the charge at the node 132, the next $\phi_2$ clock pulse causes a selective charge transfer from a following node 144 (comprising the first cell of the following register 6′) through a field-effect transistor 146 to the node 132 in exactly the same way as in the preceding shift register 6. The transistor 146 and a pair of capacitors 148 and 150, for example, correspond precisely to the transistor 26 and capacitors 22 and 20, as previously described. Thus, if the node 132 has been fully charged to the high negative voltage (−14 volts), no current flows through the field-effect transistor 146 during the subsequent $\phi_2$ clock pulse, when te node 144 is temporarily at the driving voltage of −24 volts (for example, as depicted by line B in FIG. 2C for the node 24). This state is indicated by the continuation of line W at the right and left of FIG. 2H.

However, if the node 132 is at the "low" voltage of −4 volts, a substantial current flows through the field-effect transistor 146 during the subsequent $\phi_2$ clock pulse, thereby partially discharging the node 144, and transferring approximately half of the charge difference to the node 132. This charge equalization or "dumping" from −24 V. to −4V. is indicated by line A—A in FIG. 2H, and is precisely the same as previously discussed for the various stages of the first register 6 (for example line J in FIG. 2C or G in FIG. 2D). In this manner, the data previously contained at the node 132 is transferred to the node 144 during the $\phi_2$ clock pulse, and the node 132 has also been brought to the reference voltage of −14 volts after $\phi_2$ in both cases (line W and line A—A to U in FIG. 2H) in preparation for the next conditional discharge cycle during the next occurrence of $\phi_4$.

To review the operation of the charge refresh amplifier 9, in combination with the prior cell of the input shift register 6, assume first that the node 34 is at the "low" negative voltage of −4 volts at the end of a $\phi_1$ pulse (line E in FIG. 2D), signifying that a binary "1" data bit is then present at the node 34 for transfer to the output node 24 during the next $\phi_2$ pulse. At that time (prior to $\phi_2$), the output node 24 is invariably at the reference voltage of −14 volts (line K or A in FIG. 2C), as described in Section B.

During the next $\phi_2$ clock pulse, the coupling capacitor 22 boosts the node 24 to −24 volts (line B′, FIG. 2C) and the field-effect transistor 26 turns ON. Current then flows through the field-effect transistor 26 and charges the node 34 up to −14 volts (line G, FIG. 2D) and discharges the node 24 to −14 volts (line F, FIG. 2C). At the end of the $\phi_2$ clock pulse, the capacitor 22 changes the voltage of the node 24 to −4 volts (line I, FIG. 2C). In this way, the binary "1" data bit has been transferred from the node 34 to the output node 24 after $\phi_2$.

Following the termination of the $\phi_2$ pulse, the capacitor 120, which is invariably precharged to −14 volts through the field-effect transistor 118 during the $\phi_2$ clock pulse, is not discharged through the field-effect transistor 116 to the now-grounded $\phi_2$ clock bus 12. Since the node 24 is at −4 volts in this example (binary "1" transfer), the field-effect transistor 116 if OFF and the capacitor 120 remains charged to −14 volts.

Some time after the termination of the $\phi_2$ clock pulse but before the beginning of the next $\phi_1$ clock pulse, the $\phi_4$ clock pulse of −20 volts attempts to turn ON the field-effect transistor 128. However, the gate-to-source voltage (−20 vs. −14 volts) is not sufficient to turn the transistor 128 ON, and that transistor fails to connect the transistor 116 to the following node 132. The node 132 was previously charged in all cases to the reference −14 volts, as indicated by lines W or A—A in FIG. 2H.

In this case, "1" output from the register 6, the node 132 remains fully charged to −14 volts as indicated by line U, since the conditional discharge field-effect transistor 116 is OFF.

The −14 volt charge on the node 132 indicates the binary "1" output from the node 24, and the register 6. As previously noted, each output circuit 8 inverts the data signal, and an even number of output circuits will result in no net signal inversion.

When the $\phi_4$ clock pulse ends, the field-effect transistor 128 is held OFF and the node 132 is thus isolated from the conditional discharge field-effect transistor 116 during the remainder of the cycle.

The following $\phi_1$ clock pulse is coupled through the capacitor 136 and boosts the node 132 from −14 volts to −24 volts, as indicated by line V in FIG. 2H; consequently, no significant amount of current flows through the field-effect transistor 140 since inadequate gate-to-source voltage is available to turn that transistor ON. At the end of the $\phi_1$ clock pulse, the capacitor 136 changes the node 132 back to −14 volts (line W). Consequently, a binary "1" bit at the node 24 has been inverted and inserted into the node 132; and has then been erased from the node 24. The voltage at node 24 is replenished during $\phi_1$ in this case ("1" transfer), by the charge-input circuit 13 restoring the node 24 to −14 volts as previously described and as indicated by line J in FIG. 2C.

At the beginning of the next $\phi_2$ pulse, the coupling capacitor 148 boosts the node 144 from −14 volts to −24 volts. Since the node 132 is at −14 volts in this example (line W), no current flows through the field-effect transistor 146. Consequently, at the end of the $\phi_2$ clock pulse, the capacitor 148 simply changes the node 144 back to −14 volts, and a "1" ouptut from the first register 6 has been transferred (in inverted form) through the first cell of the following register 6' for further cyclical transfer to the right through the register 6' in the same manner that the data advances through the register 6.

To follow the transfer of a binary "0" from the final cell of the register 6 through the first cell of the following register 6', the description starts at the point where the node 34 is at the "high" negative voltage, −14 volts, at the end of the $\phi_1$ pulse (line C in FIG. 2D). This indicates that a binary "0" bit is present at the node 34, for transfer to node 24 during the next $\phi_2$ pulse. In this case, the coupling capacitor 22 boosts the node 24 to −24 volts (line B, FIG. 2C), but the transistor 26 remains OFF due to the "high" negative voltage applied to the source 32 by the node 34. There is no charge transfer from the node 24 to the node 34 during $\phi_2$, and the node 24 merely reverts to −14 volts after $\phi_2$ (line D, FIG. 2C), indicating that a "0" has been transferred to the output node 24.

During $\phi_2$, the capacitor 120 is again precharged to −14 volts through the transistor 118; however, during this cycle, it discharges to ground of the $\phi_2$ clock bus 12 after $\phi_2$ since the conditional discharge transistor 116 remains ON, indicating that a binary "0" (−14 volts) is then present at the node 24 after $\phi_2$.

After this, the next $\phi_4$ clock pulse turns ON the field-effect transistor 128, and the node 132 is also discharged through the now ON field-effect transistors 128 and 116 to the still-grounded $\phi_2$ clock bus 12, as indicated by line T in FIG. 2H. Then, the $\phi_4$ clock pulse ends and the field-effect transistor 128 turns OFF and disconnects the node 132 (which is now at ground voltage) from the still ON field-effect transistor 116.

At the beginning of the next $\phi_1$ clock pulse, the coupling capacitor 136 boosts the node 132 to −10 volts (line X) and then, during the $\phi_1$ clock pulse, the field-effect transistor 140 turns ON to correct the voltage of the node 132 to −14 volts (line Y). At the end of the $\phi_1$ clock pulse, the capacitor 136 reduces the node 132 to −4 volts (line Z). Therefore, the binary "0" condition on the node 24 has been inverted and transferred to the node 132.

At the start of the next $\phi_2$ clock pulse, the capacitor 148 invariably changes the node 144 to −24 volts as previously described. During the $\phi_2$ clock pulse, the field-effect transistor 146 conducts current and charges the node 132 to −14 volts while discharging the node 144 to −14 volts in the usual manner. At the end of the $\phi_2$ clock pulse, the capacitor 148 changes the node 144 from −14 volts to −4 volts, and the inverted "0" output from the register 6 has thus been transferred from the node 132 to the first intercell node 144 of the second register 6.

As previously stated, the refresh amplifier 9 together with the output amplifier 8 couples one shift register to another. Any number of such couplings can be made in order to link together a long chain of shift registers. Such a long chain would be capable of storing hundreds or even thousands of bits of information. These hundreds or thousands of bits are then available one at a time at the output stage 8 of the last shift register of the chain - which can be called a "final" output. Alternatively, more extensive final output circuits can be employed such as shown in the copending application of Richard H. Heeren, Ser. No. 252,682 filed on even date herewith.

The final output of such a chain of shift registers can be used to drive a cathode ray tube, as illustrated in the prior art. The final output of a chain of shift registers can also be delivered to the input of the first shift register in the chain in order to form the shift register chain into a recirculating memory. A recirculating memory can be used as a refresh amplifier for a cathode ray tube display.

E - ALTERNATE INPUT CIRCUIT

In the event that the third phase ($\phi_3$) clock pulse shown in FIG. 1 is unavailable, or does not occur at the optimum moment with respect to the input data signal (7 in FIG. 1), an alternative data input circuit 190 is shown in FIG. 3. In this embodiment, the input terminal 70, extending from the source 68 of the input transistor 64, is connected to the $\phi_1$ clock bus conductor 10. Therefore, at all times other than during the $\phi_1$ clock pulse, the terminal 70 is grounded or at zero voltage. Alternatively the terminal 70 can be connected to ground potential provided that the field-effect transistor 64 is kept off during the $\phi_1$ clock pulse in order to prevent premature discharge of the node 54. Therefore, if the gate input terminal 72 of the transistor 64 is selectively raised to substantially the negative clock voltage, perhaps less the threshold voltage, at the proper time, the node 54 can selectively be discharged to ground or zero voltage as previously described in Section C.

Certain terminals of the circuit 190 are referred to by the reference numbers 10' and 12'. The terminals 10' are connected to the clock bus conductor 10, and the terminals 12' are connected to the clock bus conductor 12.

During the $\phi_2$ clock pulse, a field-effect transistor 191 turns ON and thus grounds a capacitor 194 connected to a node 192 which is connected to the terminal 72 and thus to the gate of the field-effect transistor 64. This provides ground or zero voltage on the gate of the field-effect transistor 64 at the beginning of the next $\phi_1$ pulse. Therefore, the node 54 will not then be discharged after the next $\phi_1$ clock pulse unless the capacitor 194 is immediately recharged to a negative voltage sufficient to turn the transistor 64 ON.

To turn the transistor 64 ON after the next $\phi_1$ pulse whenever a binary "1" is to be entered into the shift register 6, a field-effect transistor 196 connected between the node 192 and the $\phi_1$ clock conductor and tries to recharge the capacitor 194 to a substantial negative voltage during the next and each succeeding $\phi_1$ pulse. If the field-effect transistor 196 succeeds in charging the capacitor 194 to a substantial negative voltage during the $\phi_1$ pulse, the field-effect transistor 64 will then discharge the node 54 after the end of the $\phi_1$ clock pulse, thereby entering a binary "1" signal into the node 54.

However, a field-effect transistor 198 can prevent the field-effect transistor 196 from recharging the capacitor 194. This is accomplished with a voltage divider effect between the negative voltage of the $\phi_1$ pulse and the grounded $\phi_2$ clock bus terminal 12'. The field-effect transistor 198 is constructed so as to be approximately twenty times as conductive as the field-effect transistor 196. Therefore, if the field-effect transistor 198 is turned ON, only a voltage less than the threshold voltage of the input field-effect transistor 64 can be applied to the capacitor 194. The field-effect transistor 198 is selectively turned ON by a large negative voltage applied to its gate and is turned OFF by a negligible or near-ground voltage applied to its gate.

During the $\phi_2$ clock pulse, a capacitor 200, connected to the gate of the field-effect transistor 198, is discharged through a field-effect transistor 202. Therefore, the field-effect transistor 198 is held in the OFF condition unless, during the subsequent $\phi_1$ pulse, a negative input voltage is applied to the drain 204 of a field-effect transistor 206. A substantial negative voltage (for example, −20 volts, the clock voltage, or −14 volts, the clock voltage less the threshold) is selectively applied during $\phi_1$ from a "Data Input" source 207 to an input terminal 208 of the input circuit 190, whenever a binary "0" is to be entered into the shift register 6. The input terminal 208 is connected to the drain 204 of the field-effect transistor 206 so that, during the $\phi_1$ clock pulse, the negative voltage from the data input source 207 may recharge the capacitor 200 to a negative voltage and turn on the field-effect transistor 198. This holds the node 192 at substantially ground potential and thus enters a binary "0" state signal into the shift register 6 by keeping the field-effect transistor 64 OFF.

However, when a negligible or near ground voltage is applied by the data input source 207 to the input terminal 208 during the $\phi_1$ clock pulse, the gate of the field-effect transistor 198 is held at ground potential during the $\phi_1$ clock pulse, keeping the field-effect transistor 198 OFF. The field-effect transistor 196 is then able to charge the capacitor 194 to a significant negative voltage in order to turn ON the input field-effect transistor 64 and thus discharge the node 54.

In the operation of the alternate input circuit 190, the $\phi_2$ clock pulse discharges the capacitor 194 to the now grounded $\phi_1$ clock bus 10 through the field-effect transistor 191. At the same time, the capacitor 200 is similarly discharged to ground potential through the field-effect transistor 202.

During the subsequent $\phi_1$ clock pulse, the node 54 is invariably charged to −14 volts (the clock voltage less the threshold) as previously described in Section C. At the same time, the field-effect transistor 196 tries to charge the capacitor 194 to −14 volts. The node 54 cannot yet be discharged; because, the terminal 70 is connected to the $\phi_1$ clock and is now at −20 volts.

If the input terminal 208 carries a substantial negative voltage (binary "0"), the capacitor 200 is charge during the $\phi_1$ clock pulse, and the field-effect transistor 198 is ON. Conduction by the field-effect transistor 198 shunts the capacitor 194 to the now-grounded $\phi_2$ clock terminal 12' and prevents the $\phi_1$ clock signal from charging the capacitor 194 through the transistor 196. After the termination of the $\phi_1$ clock pulse, the field-effect transistor 206 decouples the input terminal 208 from the field-effect transistor 198. Consequently, the capacitor 194 remains discharged and the input transistor 64 thus remains OFF, causing the node 54 to remain charged to the "0" representing charge of −14 volts.

Alternatively, if the input terminal 208 carries substantially ground voltage (binary "1" to be entered), the capacitor 200 cannot be negatively charged from the terminal 208, but stays discharged, and the field-effect transistor 198 remains OFF. The field-effect transistor 196 then succeeds in charging the capacitor 94 to a substantial negative voltage during the $\phi_1$ clock pulse. Therefore, the field-effect transistor 64 tends to be turned ON in this case. After the $\phi_1$ clock pulse ends, the terminal 70, which is connected to the $\phi_1$ clock bus 10, is grounded. Consequently, the field-effect transistor 64 is turned ON and the node 54 is discharged through the ON field-effect transistor 64 to the grounded terminal 70.

Thus, the alternate input circuit 190 of FIG. 3, serves to discharge the shift-register input node 54 to ground whenever a "1" is desired to be inserted, immediately after the end of the $\phi_1$ clock pulse, rather than by using a separate $\phi_3$ clock pulse after $\phi_1$ as in the FIG. 1 embodiment. However, the transistor 80 (FIG. 1) and coupling capacitor 60 serve to optimally adjust the input voltage at the node 54 during $\phi_1$ in both embodiments.

While various specific embodiments and examples of the invention have been described in detail above, it will be obvious that various modifications may be made from the specific details described, without departing from the spirit and scope of the invention.

What is claimed is:

1. An improved data shifting and storage circuit having a plurality of storage devices each having substantially the same storage capacity and serially interconnected by gating devices and coupled to first and second clock conductors, wherein the improvement comprises an input circuit comprising:

a first gating device having a control electrode and a first controlled electrode and a second controlled electrode, the control electrode being connected to the first clock conductor and the second controlled electrode connected to one of said storage devices;

a second gating device having a control electrode and a first controlled electrode and a second controlled electrode, the control electrode and the first controlled electrode being connected to the second clock conductor and the second controlled electrode being connected to the first controlled electrode of the first gating device;

an input storage device having a capacity substantially equal to the capacity of said storage devices, the input storage device being connected between the second clock conductor and the second controlled electrode of the second gating device; and a third gating device having a control electrode and a first controlled electrode and a second controlled electrode, the first controlled electrode being connected to the first controlled electrode of the first gating device, the control electrode being connected to a first terminal and the second controlled electrode being connected to a second terminal.

2. A combination according to claim 1 wherein the second terminal is connected to a conductor capable of assuming either of at least two voltages.

3. A combination according to claim 1 further comprising a data input terminal connected to the second terminal.

4. A combination according to claim 3 further comprising: a third clock conductor connected to the first terminal.

5. A combination according to claim 1 wherein the second terminal is connected to the first clock conductor.

6. A combination according to claim 5 further comprising a data input circuit connected to the first terminal.

7. A combination according to claim 1 further comprising an input terminal and wherein the second terminal is connected to the input terminal.

8. A data input circuit for a charge-transfer multivoltage type memory wherein the several stages of the memory include charge stores of equal magnitude, wherein a charge is transferred from stage to stage through the several stages, each charge store for storing at least two different states of data-representing charge voltage comprising:

an input charge store of magnitude substantially no more than the magnitude of the charge stores of each of the several stages;

means responsive to data signals for selectively discharging the charge of the input charge store to a voltage substantially beyond a range defined by the two states of data-representing charge voltage; and means operative after the selectively discharging means for recharging the input charge store to exactly the voltage of one of the two states of data-representing charge voltage.

9. A circuit according to claim 8 wherein the recharging means comprises: a switching device for connecting the input charge store to a reference voltage after each operation of the discharging means.

10. A circuit according to claim 8 wherein the discharging means comprises a switching device for periodically connecting the input charge store to a selectively controlled discharge terminal.

11. A circuit according to claim 10 wherein the switching device is operated after each charge-transfer operation.

12. A circuit according to claim 8 wherein the discharging means comprises a switching device for selectively connecting the input charge store to a discharge terminal.

13. A circuit according to claim 12 comprising means for selectively operating the switching device after each charge-transfer operation.

14. A circuit according to claim 13 wherein the selectively operating means comprises: means for generating a timing signal after each charge transfer operation; and means responsive to input data signals gating the timing signal to the switching device.

15. A method of delivery of data to a charge-transfer-type shift register having charge storage elements in each stage which store binary data bits at either of two distinct voltage levels, gating devices for transferring charge sequentially from charge storage element to charge storage element, and a separate input charge storage element comprising:

substantially matching the capacity of the input storage element to the storage elements of the several stages;

discharging the input storage element of the input stage of the register to a voltage beyond a range defined by the two voltages; and recharging the charge voltage on the input storage element to one of said two voltage levels.

16. A method of delivering data to a charge-transfer-type circuit wherein data are stored on charge storage devices having two data-representing voltage states and wherein charge is transferred from charge storage device to charge storage device by gating devices wherein the circuit has at least an input stage, comprising:

selectively discharging the storage element of the input stage of the register to a voltage outside of a range defined by said two voltages; and correcting the charge on the storage element of the input stage to one of the two voltages.

* * * * *